US012680911B2

(12) United States Patent
    Karcher

(10) Patent No.:    US 12,680,911 B2
(45) Date of Patent:        Jul. 14, 2026

(54) ENCODER WHEEL FOR USE IN AN INTERNAL COMBUSTION ENGINE

(71) Applicant: AUDI AG, Ingolstadt (DE)

(72) Inventor: Rolf Karcher, Neckarsulm (DE)

(73) Assignee: AUDI AG, Ingolstadt (DE)

( * ) Notice:    Subject to any disclaimer, the term of this patent is extended or adjusted under 35 U.S.C. 154(b) by 386 days.

(21) Appl. No.:    18/260,982

(22) PCT Filed:    Dec. 8, 2021

(86) PCT No.:    PCT/EP2021/084689
    § 371 (c)(1),
    (2) Date:    Jul. 11, 2023

(87) PCT Pub. No.:    WO2022/148588
    PCT Pub. Date: Jul. 14, 2022

(65)            Prior Publication Data
    US 2024/0060856 A1      Feb. 22, 2024

(30)        Foreign Application Priority Data

Jan. 11, 2021    (DE) .......................... 102021100286.9

(51) Int. Cl.
    *G01M 15/06*            (2006.01)
(52) U.S. Cl.
    CPC ................................... *G01M 15/06* (2013.01)
(58) Field of Classification Search
    CPC ..... G01M 15/046; G01M 15/06; G01M 15/11
    See application file for complete search history.

(56)            References Cited

U.S. PATENT DOCUMENTS

| 5,460,134 | A | | 10/1995 | Ott et al. | |
|---|---|---|---|---|---|
| 5,753,804 | A | * | 5/1998 | La Palm ................ | G01M 15/11 123/436 |
| 5,767,394 | A | | 6/1998 | Butts et al. | |
| 2003/0000498 | A1 | | 1/2003 | Matthews et al. | |
| 2005/0028770 | A1 | * | 2/2005 | McCabe ................... | F01L 1/34 123/90.17 |

(Continued)

FOREIGN PATENT DOCUMENTS

| CN | 1047568 A | 12/1990 |
|---|---|---|
| CN | 102472192 A | 5/2012 |

(Continued)

OTHER PUBLICATIONS

International Preliminary Report on Patentability issued on Jul. 4, 2023, in corresponding International Application No. PCT/EP2021/084689, 17 pages.

(Continued)

*Primary Examiner* — Eric S. McCall
(74) *Attorney, Agent, or Firm* — Maier & Maier, PLLC

(57)            ABSTRACT

An encoder wheel for an internal combustion engine, having six indicator elements, which are arranged spaced apart from one another in the circumferential direction with respect to a rotational axis of the encoder wheel on a main body of the encoder wheel. Flanks arranged in the same direction of the indicator elements are arranged equidistantly to one another in the circumferential direction. The indicator elements each have one of three different indicator element extensions in the circumferential direction.

8 Claims, 2 Drawing Sheets

(56)                    References Cited

U.S. PATENT DOCUMENTS

| | | | |
|---|---|---|---|
| 2012/0101708 A1 | 4/2012 | Hirai et al. | |
| 2016/0195454 A1* | 7/2016 | Edwards | G01K 13/08 |
| | | | 374/144 |
| 2017/0322233 A1* | 11/2017 | Grambichler | G01P 13/045 |
| 2019/0368902 A1* | 12/2019 | Utermoehlen | G01D 5/142 |
| 2020/0256709 A1 | 8/2020 | Weber | |
| 2022/0003177 A1* | 1/2022 | Joseph | F02D 41/009 |
| 2023/0341435 A1* | 10/2023 | Binder | G01P 3/487 |

FOREIGN PATENT DOCUMENTS

| | | |
|---|---|---|
| CN | 104895673 A | 9/2015 |
| CN | 111553377 A | 8/2020 |
| DE | 4141713 A1 | 6/1993 |
| DE | 4310460 A1 | 10/1994 |
| DE | 10246224 A1 | 4/2004 |
| DE | 102014203795 A1 | 9/2015 |
| DE | 102014009559 A1 | 12/2015 |
| WO | 2020099625 A1 | 5/2020 |

OTHER PUBLICATIONS

International Search Report and Written Opinion issued on Apr. 12, 2022, in corresponding International Application No. PCT/EP2021/084689, 17 pages.
Office Action issued on Nov. 22, 2025, in corresponding Chinese Application No. 202180089583.8, 14 pages.

* cited by examiner

1

ENCODER WHEEL FOR USE IN AN INTERNAL COMBUSTION ENGINE

FIELD

The invention relates to an encoder wheel for an internal combustion engine, having six indicator elements which are arranged spaced apart from one another in the circumferential direction with respect to an axis of rotation of the encoder will on a main body of the encoder wheel, wherein flanks of the indicator elements arranged in the same direction are arranged equidistantly from one another in the circumferential direction. The invention furthermore relates to an internal combustion engine and a method for operating an internal combustion engine.

BACKGROUND

Document DE 41 41 713 A1 is known from the prior art, for example. This describes an encoder arrangement for cylinder identification in an internal combustion engine, having a crankshaft encoder having an increment disk having a reference mark and a camshaft encoder having long and short segments and short and long intermediate spaces between the segments. By combining the pulse sequences supplied by the two encoders, a unique combination of high and low phases may be generated, which enables a unique and rapid cylinder and cylinder group identification. The beginning of a sequential injection system thereupon takes place so that all the cylinders which can still be serviced "before inlet closes" are injected simultaneously. In the event of a defect of the crankshaft encoder, an emergency mode using the camshaft signal is possible, since the combination of the high-low phases enables a cylinder identification and the rear flanks of the camshaft signal generated at angle-fixed intervals can be used as trigger marks for the ignition or injection.

SUMMARY

It is the object of the invention to propose an encoder wheel for an internal combustion engine, which has advantages over known encoder wheels, in particular enables extremely precise determination of a rotational angle position of the encoder wheel, and preferably ensures a maximum signal resolution with the most accurate possible ascertainment of the rotational angle position and short quick-start times.

This is achieved according to the invention by an encoder wheel for an internal combustion engine. It is provided here that the indicator elements each have one of three different indicator element extensions in the circumferential direction.

The encoder wheel is preferably part of the internal combustion engine, but of course can also be present separately therefrom. The encoder wheel is provided and designed for the purpose of ascertaining a rotational angle position of the encoder wheel or enabling such an ascertainment in a simple manner A corresponding sensor is used to ascertain the rotational angle position. The encoder wheel is preferably connected with respect to drive to a shaft of the internal combustion engine, in particular a camshaft of the internal combustion engine, and is mounted so it is jointly rotatable therewith. In this case, the encoder wheel is used to ascertain a rotational angle position of this shaft.

The encoder wheel is rotatable or rotatably mounted around the axis of rotation. It has the six indicator elements, preferably precisely six or only six indicator elements. The indicator elements are arranged spaced apart from one another in the circumferential direction with respect to the axis of rotation on the main body of the encoder wheel. They preferably each extend outward in the radial direction originating from the main body. The main body is preferably round or circular cylindrical in this case.

Intermediate spaces are present in the circumferential direction between the indicator elements, so that the indicator elements are arranged spaced apart from one another in the circumferential direction. One such intermediate space is present in this case between each two of the indicator elements or one of the indicator elements is present between each two of the intermediate spaces. In other words, the indicator elements and the intermediate spaces are arranged alternating in the circumferential direction.

The sensor, by means of which the rotational angle position of the encoder wheel or the shaft coupled thereto is ascertained, is provided and designed for sensing the indicator elements and/or the intermediate spaces. For example, the sensor supplies a first signal level upon overlap with one of the indicator elements and a second signal level different from the first signal level upon overlap with one of the intermediate spaces present between the indicator elements. The overlap is to be understood to mean that the sensor and the respective indicator element or the respective intermediate space are arranged at the same point viewed in the circumferential direction with respect to the axis of rotation.

The sensor can in principle be designed arbitrarily. For example, it is provided in the form of a Hall sensor or the like. The Hall sensor preferably includes only or precisely one Hall element. Alternatively, it can also have two Hall elements. The sensor can also be designed as an inductive encoder or magnetoresistive encoder. In each case, the sensor, the indicator elements, and the intermediate spaces are designed in such a way that the indicator elements are distinguishable from the intermediate spaces by means of the sensor. Moreover, the intermediate spaces are not to be understood to mean that they are necessarily empty or are provided as cavities or air spaces. Rather, the intermediate spaces are solely distinguished from the indicator elements insofar as they can be distinguished from them by means of the sensor.

It can fundamentally be provided that the indicator elements are present in the form of teeth, which originate from the main body and extend outward in the radial direction originating therefrom, whereas the intermediate spaces are designed as cavities or air spaces. However, it can also be provided that the indicator elements consist of a first material or include this first material, whereas a second material different from the first material is present in the intermediate spaces.

To enable reliable and uniform ascertainment of the rotational angle position of the encoder wheel, the flanks of the indicator elements arranged in the same direction are to be arranged equidistantly from one another in the circumferential direction. The flanks of the indicator elements delimit them in the circumferential direction. In particular, each indicator element includes two flanks spaced apart from one another viewed in the circumferential direction, so that each of the indicator elements extends in each case from a first flank up to a second flank. The first plank is, for example, a leading flank leading in the rotational direction and the second flank is a trailing flank trailing in the rotational direction. Each of the flanks separates one of the indicator elements in the circumferential direction from one of the intermediate spaces. This means that the respective indicator element is arranged on one side of each of the flanks and one of the intermediate spaces is arranged on the other side of the flank.

Flanks arranged in the same direction are to be understood as flanks of the indicator element which are present in the circumferential direction on the same side of the indicator elements. For example, the leading flanks of the indicator elements represent the flanks arranged in the same direction. Alternatively, however, the flanks arranged in the same direction can also be the trailing flanks of the indicator elements. It is thus apparent that the indicator elements each include two flanks arranged in the same direction, namely first flanks arranged in the same direction and second flanks, different from the first flanks, arranged in the same direction, wherein each of the indicator elements includes one of the first flanks and one of the second flanks or is delimited thereby in each case. The first flanks or the second flanks are arranged equidistantly from one another, for the respective other flanks, thus the second flanks or the first flanks, this is not necessarily or is not the case.

An equidistant arrangement of the flanks is to be understood to mean that, in the circumferential direction, they have the same distances from one another or in each case directly adjacent ones of the flanks arranged in the same direction are each arranged at the same uniform distance. In other words, the flanks arranged in the same direction in the circumferential direction are arranged uniformly distributed on the encoder wheel. This design of the encoder wheel enables precise and uniform ascertainment of the rotational angle position of the encoder wheel.

During operation of the internal combustion engine, it is often necessary to determine the absolute rotational angle position of the encoder wheel as quickly as possible. To ascertain the absolute rotational angle position of the encoder wheel, for example, it is provided that one of the indicator elements is removed or at least designed to having an extension different from the further indicator elements in the circumferential direction with respect to the axis of rotation, so that as the indicator element runs past the sensor, the presence of a specific absolute rotational angle position can be concluded. The further indicator elements can be used subsequently thereto to ascertain a relative change of the rotational angle position in relation to this determined rotational angle position and to ascertain the respective present absolute rotational angle position therefrom using the determined rotational angle position.

However, such a design of the encoder wheel has the result that—depending on the present rotational angle position of the encoder wheel—an extensive rotational movement of the encoder wheel is necessary until its absolute rotational angle position is ascertained, namely up to the rotational angle position in which the indicator element or its absence can be sensed. To accelerate the procedure of ascertaining the absolute rotational angle position, it has been proposed that two different indicator element extensions be used in the circumferential direction for the indicator elements. The absolute rotational angle position can be concluded faster during the rotational movement of the encoder wheel from the different indicator element extensions.

In experiments of the applicant, it has surprisingly been shown that, with the use of an encoder wheel having six indicator elements and three different indicator element extensions, an optimum of accuracy is achieved in the ascertainment of the absolute rotational angle position or the absolute rotational angle position is ascertained particularly quickly. This is therefore based on the fact that the sensor used enables a resolution of 20°. This means that indicator elements and intermediate spaces having an extension of at least 20° in the circumferential direction can be readily sensed reliably by means of the sensor. The sensor is designed accordingly for this purpose.

The encoder wheel is embodied in such a way that each of the three different indicator element extensions is used at least for one of the indicator elements. The indicator element extensions are particularly preferably each used for equal numbers of the indicator elements, however, so that in each case two of the indicator elements have the same indicator element extension. The encoder wheel is preferably designed in such a way that the indicator elements and the intermediate spaces present between them each have an extension in the circumferential direction with respect to the axis of rotation of at least 15°, at least 17.5°, or at least 20°. The dimensions are particularly preferably at least 18°, at least 18.5°, or at least 19°.

Additionally or alternatively, it is provided that the three different indicator element extensions each differ from one another by a factor of at least 1.25, at least 1.5, or at least 1.75. For example, the different indicator element extensions have the following base values: 20°, 40°, and 60°. The indicator element extensions can directly correspond to these starting values. However, it can also be provided that the indicator element extensions correspond to the starting values minus a constant value in each case. This constant value is, for example, at least 1.6°, at least 1.7°, or at least 1.8°. Therefore, for example, the following values results for the different indicator element extensions: 18.4°, 28.4°, and 38.4° or 18.3°, 28.3°, and 38.3° or 18.2°, 28.2°, and 38.2°. An offset of the sensor can be taken into consideration by the consideration of this offset angle, for example. The mentioned values have proven to be ideal for this purpose.

One refinement of the invention provides that at least two directly adjacent ones of the indicator elements form an indicator element pair and have the same indicator element extensions. Directly adjacent indicator elements are to be understood as those of the indicator elements between which only one of the intermediate spaces is present. Thus, one of the indicator elements of the indicator element pair is present on one side of the intermediate space and another indicator element of the indicator element pair is present on the other side. The indicator elements of the indicator element pair have identical indicator element extensions, so that the indicator element extensions of the indicator elements are thus equal to precisely one of the three different indicator element extensions.

Particularly preferably, in each case at most two directly successive ones of the indicator elements have the same indicator element extensions. Accordingly, the indicator element pair is preferably bordered in the circumferential direction by indicator elements which have indicator element extensions deviating from the indicator element extension of the indicator element pair. Preferably, at least two indicator element pairs are present, particularly preferably precisely two indicator element pairs. This means that at least two of the indicator elements, which have the same of the three different indicator element extensions, in each case accommodate at least one of the other indicator elements between them on both sides in the circumferential direction. Such a design and arrangement of the indicator elements enables a particularly rapid ascertainment of the absolute rotational angle position of the encoder wheel, with minimal variance at the same time.

One refinement of the invention provides that intermediate spaces are present in the circumferential direction between the indicator elements, which each have one of three different intermediate space extensions in the circumferential direction. The statements made for the indicator elements thus insofar apply for the intermediate spaces. Each of the intermediate spaces has an intermediate space extension in the circumferential direction, wherein the intermediate space extension of each of the intermediate spaces corresponds to precisely one of the three different intermediate space extensions. Each of the three different intermediate space extensions is assigned to at least one of the intermediate spaces, but preferably multiple of the intermediate spaces. The three different intermediate space extensions are particularly preferably distributed uniformly onto the intermediate spaces, so that in each case two of the intermediate spaces are designed having identical intermediate space extensions.

Similarly to the statements for the indicator elements, each two of the intermediate spaces can form an intermediate space pair. The intermediate spaces of such an intermediate space pair accommodate one of the indicator elements between them, so that one of the intermediate spaces directly adjoins this indicator element on one side and another of the intermediate spaces directly adjoins this indicator element on the other side. The intermediate spaces of the intermediate space pair have the same intermediate space extensions. Again, preferably at least two, in particular precisely two intermediate space pairs are present. In the latter case, at least two intermediate spaces which have identical intermediate space extensions are present in the encoder wheel such that at least one other one of the intermediate spaces is arranged between them on both sides in each case. This design also enables a rapid and precise ascertainment of the absolute rotational angle position of the encoder wheel.

One refinement of the invention provides that each of the intermediate spaces has an intermediate space extension in the circumferential direction, which is in a ratio fixed for all intermediate spaces to the respective indicator element extension of the indicator element bordering the corresponding intermediate space, in particular its indicator element leading in the rotational direction of the encoder wheel. In other words, one of the intermediate spaces adjoins each of the indicator elements on the same side, wherein the intermediate space extensions of the intermediate space are in the fixed ratio to the indicator element extension of the indicator element. The intermediate spaces are always to be arranged on the same side of the indicator elements in the circumferential direction. For example, the intermediate spaces are each the intermediate spaces trailing the indicator elements in the rotational direction of the encoder wheel. Vice versa, the indicator element bordering the respective intermediate space accordingly leads this intermediate space in the rotational direction of the encoder wheel. In this way, a rapid identification of the absolute rotational angle position is implemented.

One refinement of the invention provides that each of the indicator elements includes a leading flank leading in the rotational direction and a trailing flank trailing in the rotational direction and the equidistantly arranged flanks of the leading flanks. Each of the indicator elements is bordered in the circumferential direction or rotational direction on one side by the respective leading flank and on the other side by the respective trailing flank. The leading flank is arranged in the circumferential direction with respect to the trailing flank such that it lies in front in the rotational direction. The flanks arranged in the same direction of the indicator elements, which are to be arranged equidistantly to one another, are the leading flanks, thus the flanks leading in the rotational direction of the encoder wheel. The rapid ascertainment of the absolute rotational angle position of the encoder wheel is also implemented in this way. A reverse design could obviously also be implemented—depending on the evaluation and/or a design of the control unit performing the evaluation.

One refinement of the invention provides that the indicator elements in the circumferential direction have their respective leading flank at the following angular positions: 0°, 60°, 120°, 180°, 240°, and 300°, and that the indicator elements have the following indicator element extensions viewed in the circumferential direction: 40°, 40°, 30°, 20°, 20°, 30°. The leading flanks of the indicator elements are insofar formed uniformly distributed on the encoder wheel in the circumferential direction. However, the indicator elements differ with respect to the indicator element extensions. The three following different indicator element extensions are used for the indicator elements: 20°, 30°, and 40°.

The indicator elements are arranged in succession in the circumferential direction such that the indicator elements having the largest indicator element extensions are in direct succession. This applies accordingly to the indicator elements having the smallest indicator element extensions. Those indicator elements which have indicator element extensions which lie between the smallest indicator element extensions and the largest indicator element extensions are arranged spaced apart from one another in the circumferential direction, so that at least one of the other indicator elements is present between them on both sides. The mentioned arrangement of the indicator elements and their indicator element extensions have surprisingly proven to be ideal.

One refinement of the invention provides that the indicator element extensions of the indicator elements are each reduced by the same offset angle. This is to be understood to mean that the indicator elements actually do not have the above-mentioned indicator element extensions, but are smaller in the circumferential direction. The mentioned indicator element extensions are thus used as starting values. However, these are each reduced by the same offset angle. The offset angle is, for example, at least or precisely 1.6°, at least or precisely 1.7°, or at least or precisely 1.8°, so that, for example, the following values result for the three different indicator element extensions: 18.4°, 28.4°, and 38.4° or 18.3°, 28.3°, and 38.3° or 18.2°, 28.2°, and 38.2°. An offset of the sensor can be compensated for in a simple manner by such a design of the encoder wheel. Accordingly, in spite of the offset of the sensor, a reliable ascertainment of the rotational angle position of the encoder wheel and in particular the absolute rotational angle position of the encoder wheel is achieved.

The invention furthermore relates to an internal combustion engine, having a crankshaft and a camshaft connected to the crankshaft in terms of drive, wherein a crankshaft encoder wheel including multiple indicator elements is coupled in a rotationally-fixed manner to the crankshaft and an encoder wheel including six indicator elements and designed as a crankshaft encoder wheel, in particular an encoder wheel according to the statements in the scope of this description, is coupled in a rotationally-fixed manner to the camshaft, and wherein the internal combustion engine includes a crankshaft encoder sensor for sensing the indicator elements of the crankshaft encoder wheel and a camshaft encoder sensor for sensing the indicator elements of the camshaft encoder wheel, wherein flanks arranged in the same direction of the indicator elements are arranged equidistantly to one another in the circumferential direction. It is provided here that the indicator elements of the camshaft encoder wheel each have one of three different extensions in the circumferential direction.

The advantages of such a design of the internal combustion engine and/or the encoder wheel have already been indicated. Both the internal combustion engine and the encoder wheel can be refined according to the statements in the scope of this description, so that reference is insofar made thereto.

The internal combustion engine has at least two shafts, namely the (at least one) crankshaft and the (at least one) camshaft. The camshaft is connected in terms of drive to the crankshaft, so that the camshaft is driven by the crankshaft during operation of the internal combustion engine. A constant transmission ratio is preferably present between the crankshaft and the camshaft, which is preferably 2:1. Self-evidently, the camshaft can be connected in terms of drive to the crankshaft via a camshaft adjuster, by means of which the rotational angle position of the camshaft in relation to the rotational angle position of the crankshaft is settable within a defined positioning angle range. During the adjustment, the transmission ratio temporarily deviates from the constant transmission ratio.

The crankshaft encoder wheel is coupled to the crankshaft and the camshaft encoder wheel is coupled to the camshaft. The respective encoder wheel is preferably seated directly on the respective shaft. The crankshaft encoder wheel includes multiple indicator elements which can be sensed with the aid of the crankshaft encoder sensor. For example, the crankshaft encoder wheel has a number of indicator elements which is greater by an integer factor, in particular by a factor of at least 3, at least 6, at least 8, or at least 10, then a number of the indicator elements of the camshaft encoder wheel. The latter has the six indicator elements, so that the crankshaft encoder wheel has, for example, at least 36 indicator elements, at least 48 indicator elements, or at least 60 indicator elements. A design of the crankshaft encoder wheel having at least 55, at least 70, or at least 100 can self-evidently also be implemented.

To achieve a particularly high resolution of the rotational angle position by means of the crankshaft encoder wheel, it is preferably embodied having a larger diameter than the crankshaft encoder wheel. For example, the diameter of the crankshaft encoder wheel is at least 50%, at least 75%, or at least 100% larger than the diameter of the camshaft encoder wheel.

One refinement of the invention provides that the camshaft encoder sensor is provided and designed to generate a first signal level upon overlap with one of the indicator elements and to generate a second signal level different from the first signal level upon overlap with one of the intermediate spaces present between the indicator elements. Such a design of the internal combustion engine or the camshaft encoder sensor has already been indicated. The first signal level is preferably lower than the second signal level, so that upon a transition from one of the indicator elements to one of the intermediate spaces a rising signal flank is present and upon a transition from one of the intermediate spaces to one of the indicator elements, vice versa, a falling signal flank is present. The described design of the internal combustion engine or the sensor is used for extremely accurate ascertainment of the rotational angle position of the camshaft.

The invention moreover relates to a method for operating an internal combustion engine, in particular an internal combustion engine according to the statements in the scope of this description, wherein the internal combustion engine has a crankshaft and a camshaft connected to the crankshaft in terms of drive, wherein a crankshaft encoder wheel including multiple indicator elements is coupled in a rotationally-fixed manner to the camshaft and an encoder wheel, which includes six indicator elements and is designed as a camshaft encoder wheel, in particular an encoder wheel according to the statements in the scope of this description, is coupled in a rotationally-fixed manner to the camshaft, and wherein the combustion engine senses the indicator elements of the crankshaft encoder wheel by means of a crankshaft encoder sensor and senses the indicator elements of the camshaft encoder wheel by means of a camshaft encoder sensor, wherein flanks arranged in the same direction of the indicator elements are arranged equidistantly to one another in the circumferential direction. It is again provided here that the indicator elements of the camshaft encoder wheel each have one of three different extensions in the circumferential direction.

Reference is again made to the statements in the scope of this description with respect to the advantages and possible advantageous embodiments and refinements.

It is preferably provided that the rotational angle position of the camshaft encoder wheel is ascertained as a function of a signal of the camshaft encoder sensor assigned to the crankshaft encoder wheel. For example, if a specific signal level of the camshaft encoder sensor is present, a first rotational angle position is identified, if a first signal level of the crankshaft encoder sensor is present, and a second rotational angle position is identified if a second signal level of the crankshaft encoder sensor deviating from the first signal level is present.

The features and combinations of features described in the description, in particular the features and combinations of features described in the following description of the figures and/or shown in the figures are usable not only in the respective specified combination but also in other combinations or alone, without departing from the scope of the invention. Therefore, embodiments are also to be considered to be comprised by the invention which are not explicitly shown or explained in the description and/or the figures, but can be inferred from the explained embodiments or are derivable therefrom.

BRIEF DESCRIPTION OF THE FIGURES

The invention will be explained in more detail hereinafter on the basis of exemplary embodiments illustrated in the drawings, without the invention being restricted. In the figures.

DETAILED DESCRIPTION

Figure 1:
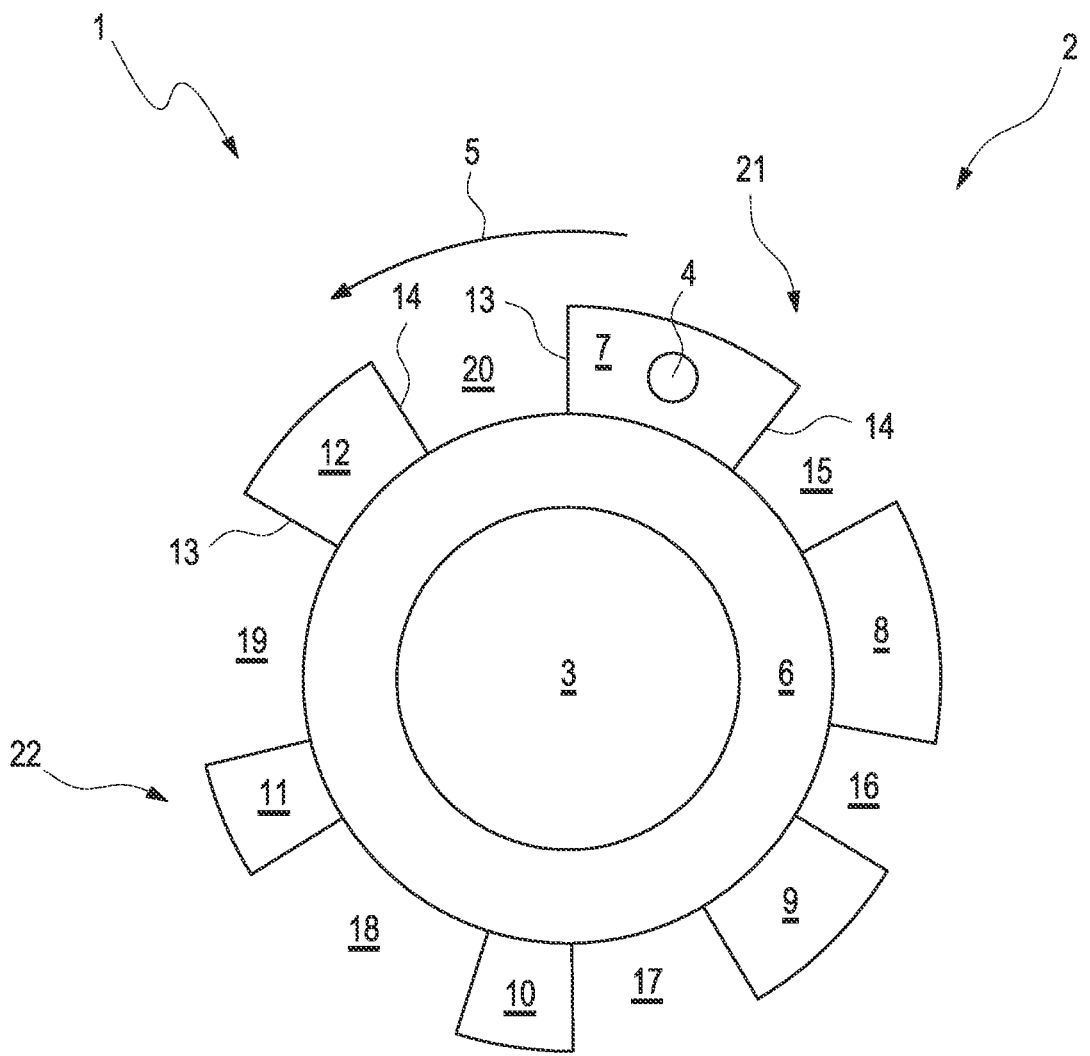
FIG. 1 shows a schematic illustration of an area of an internal combustion engine which has a camshaft and an encoder wheel coupled thereto.

FIG. 1 shows a schematic illustration of an area of an internal combustion engine 1, namely an encoder wheel 2 designed as a camshaft encoder wheel, which is seated on a camshaft 3 (only indicated here) of the internal combustion engine 1. The encoder wheel 2 cooperates with a camshaft encoder sensor 4 in order to ascertain a rotational angle position of the camshaft 3. A rotational direction of the camshaft 3 and therefore of the encoder wheel 2 is indicated by the arrow 5. It is to be noted that the camshaft encoder sensor 4 and its arrangement are only shown very schematically. Preferably, notwithstanding the illustration, the camshaft encoder sensor 4 is arranged farther outward in the radial direction with respect to a rotational axis of the encoder wheel 2 than the encoder wheel 2 and is provided in overlap therewith in the axial direction.

The encoder wheel 2 has a main body 6, from which six indicator elements 7, 8, 9, 10, 11, and 12 originate. Each of the indicator elements 7 to 12 has two flanks 13 and 14, wherein the flank 13 is provided as the leading flank leading in the rotational direction and the flank 14 is provided as the trailing flank trailing the leading flank 13 in the rotational direction. The flanks 13 and 14 are only shown by way of example for some of the indicator elements 7 to 12. Intermediate spaces 15, 16, 17, 18, 19, and 20 are present in the circumferential direction between the indicator elements 7 to 12.

The indicator elements 7 to 12 are arranged such that their leading flanks 13 are arranged uniformly on the main body 6 in the circumferential direction. The leading flanks 13 thus have identical distances from one another in the circumferential direction. The indicator elements 7 to 12 each have an indicator element extension in the circumferential direction. Three different values for the indicator element extensions are present in this case. In the exemplary embodiment shown here, the indicator elements 7 and 8 are designed having the same indicator element extensions. Furthermore, the indicator elements 9 and 12 have the same indicator element extensions and the indicator elements 10 and 11 do likewise. The indicator elements 7 and 8 form in this case an indicator element pair 21 made up of indicator elements directly successive in the circumferential direction having the same indicator element extensions. The indicator elements 10 and 11 form a further indicator element pair 22, for which the same applies.

In the exemplary embodiment illustrated here, starting values are provided for the three different indicator element extensions, which have the same distance from one another. For example, the starting values are 20°, 30°, and 40°. The starting values insofar result by incrementing a starting value, 20° here, by a difference value, 10° here. The indicator element extensions are less than the starting values, however, namely in each case by the same offset angle, which is, for example, at least 1.6°, at least 1.7°, or at least 1.8°. In the exemplary embodiment shown here, the indicator element extensions have the following values: 18.3°, 28.3°, and 38.3°. Alternatively, the indicator element extensions could also be greater than the starting values, in particular by the same offset angle, which can have one of the above-mentioned values. The indicator element extensions can also correspond to the starting values. The deviation is selected so as to take into consideration the difference of a sensor value from the design.

Figure 2:
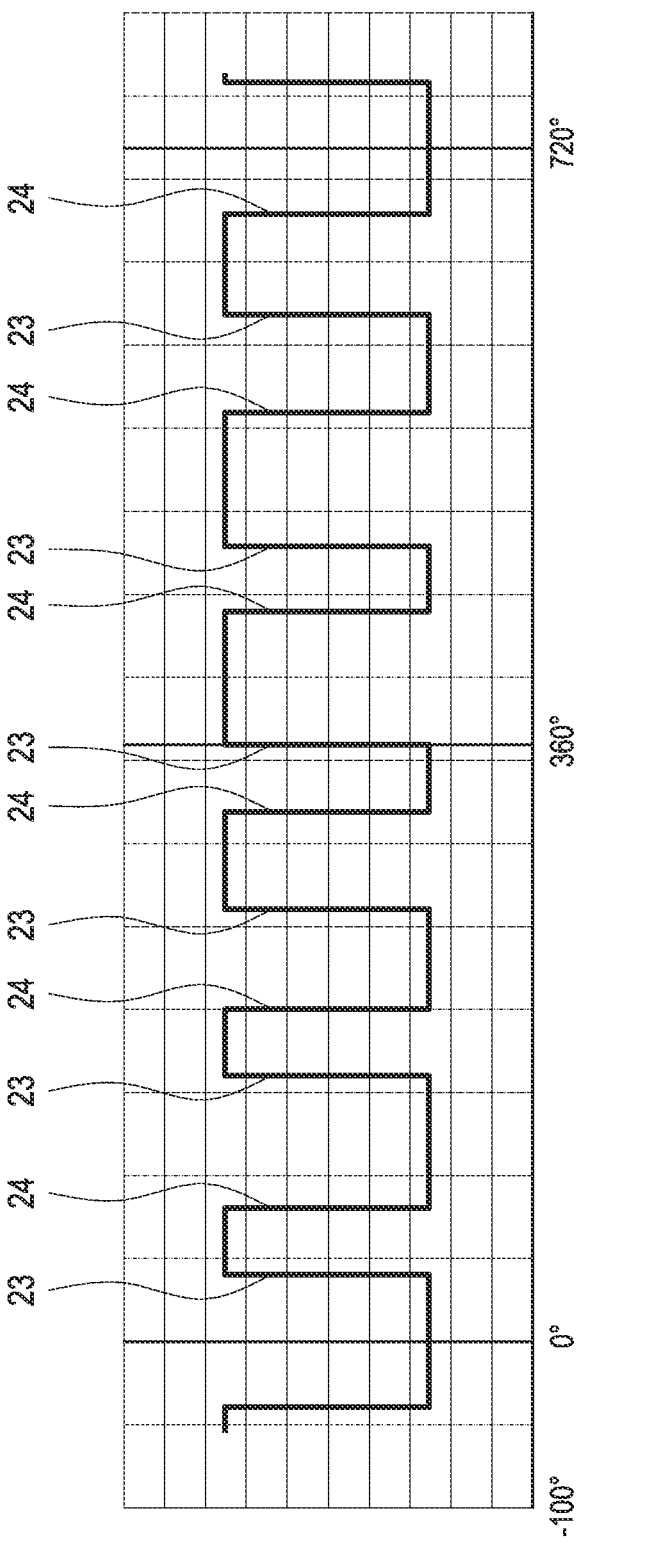
FIG. 2 shows a diagram in which a signal of a sensor is plotted by way of example, which is provided and designed for sensing indicator elements of the encoder wheel.

FIG. 2 shows a diagram in which a sensor value of the camshaft encoder sensor 4 is plotted over a crankshaft angle of a crankshaft of the internal combustion engine. The crankshaft rotates at twice the speed of the camshaft 3, so that two revolutions of the crankshaft result for a single revolution of the camshaft 3 and therefore of the encoder wheel 2. The encoder wheel 2 is shown in the present case for the rotational angle position 0°. It is apparent that in case of an overlap of one of the indicator elements 7 to 12 and the camshaft encoder sensor 4, a first signal level is present and, in the case of an overlap between one of the intermediate spaces 15 to 20 and the camshaft encoder sensor 4, a second signal level is present, wherein the first signal level is less than the second signal level.

For an entire revolution of the encoder wheel 2, a large number of signal flanks 23 and 24 are available, wherein the signal flanks 23 are rising signal flanks and the signal flanks 24 are falling signal flanks. These are indicated here solely by way of example. It is apparent that with the aid of the signal of the camshaft encoder sensor 4, an absolute rotational angle position of the encoder wheel 2 of the camshaft 3 can be rapidly ascertained. At the same time, due to the uniform arrangement of the following flanks 24, a continuous and uniform ascertainment of the rotational angle position is implemented. A direct determination of the absolute rotational angle position of the encoder wheel 2 is possible in particular starting from 0° and starting from 360°. Likewise during a passage from 360° and 720°. The described design of the internal combustion engine 1 or the encoder wheel 2 insofar enables a rapid and accurate ascertainment of the absolute rotational angle position of the camshaft 3.

LIST OF REFERENCE SIGNS

1 internal combustion engine
2 encoder wheel
3 camshaft
4 camshaft encoder sensor
5 arrow
6 main body
7 indicator element
8 indicator element
9 indicator element
10 indicator element
11 indicator element
12 indicator element
13 flank
14 flank
15 intermediate space
16 intermediate space
17 intermediate space
18 intermediate space
19 intermediate space
20 intermediate space
21 indicator element pair
22 indicator element pair
23 flank
24 flank

The invention claimed is:

1. An encoder wheel for an internal combustion engine, comprising:

six indicator elements, which are arranged spaced apart from one another in the circumferential direction with respect to a rotational axis of the encoder wheel on a main body of the encoder wheel, each indicator element having a leading flank and a trailing flank;

wherein flanks of the indicator elements that are arranged in the same direction, either the leading flanks or the trailing flanks, are arranged equidistant from one another in the circumferential direction; and wherein the indicator elements each have one of three different indicator element extensions in the circumferential direction, wherein at least two directly adjacent indicator elements form an indicator element pair and have the same indicator element extensions.

2. The encoder wheel of claim 1, wherein the indicator elements have their respective leading flanks at the angular positions 0°, 60°, 120°, 180°, 240°, and 300°, and wherein the indicator elements at those positions have respective indicator element extensions of 40°, 40°, 30°, 20°, 20°, and 30°.

3. The encoder wheel of claim 1, wherein the three indicator element extensions are each reduced by an identical offset angle $\Delta$ from respective base values.

4. The encoder wheel of claim 1, wherein intermediate spaces are present in the circumferential direction between the indicator elements and each intermediate space has precisely one of three different intermediate space extensions in the circumferential direction.

5. The encoder wheel of claim 4, wherein each intermediate space has an extension in the circumferential direction measured between a trailing flank of a respective indicator element and a leading flank of a following indicator element in the rotational direction, and wherein the extension of each intermediate space is equal to r times the extension of the respective indicator element measured between its leading and trailing flanks, where r is identical for all intermediate spaces.

6. An internal combustion engine, comprising:

a crankshaft and a camshaft connected to the crankshaft in terms of drive;

a crankshaft encoder wheel including multiple indicator elements coupled in a rotationally fixed manner to the crankshaft; and a camshaft encoder wheel including six indicator elements coupled in a rotationally fixed manner to the camshaft, the camshaft encoder wheel being the encoder wheel of claim 1;

wherein the internal combustion engine includes a crankshaft encoder sensor configured to sense the indicator elements of the crankshaft encoder wheel and a camshaft encoder sensor configured to sense the indicator elements of the camshaft encoder wheel; and wherein flanks of the indicator elements of the camshaft encoder wheel that are arranged in the same direction, either the leading flanks or the trailing flanks, are arranged equidistant from one another in the circumferential direction, and the indicator elements of the camshaft encoder wheel each have one of three different indicator element extensions in the circumferential direction.

7. The internal combustion engine of claim 6, wherein the camshaft encoder sensor is configured to generate a first signal level upon overlap with one of the indicator elements and to generate a second signal level different from the first signal level upon overlap with one of the intermediate spaces present between the indicator elements.

8. A method for operating an internal combustion engine having a crankshaft and a camshaft, the method comprising:

sensing, by a crankshaft encoder sensor, indicator elements of a crankshaft encoder wheel that is coupled in a rotationally fixed manner to the crankshaft;

sensing, by a camshaft encoder sensor, indicator elements of a camshaft encoder wheel that is coupled in a rotationally fixed manner to the camshaft and includes six indicator elements, wherein each of the indicator elements of the camshaft encoder wheel includes a leading flank and a trailing flank;

generating, by the camshaft encoder sensor, a sensor signal having a first level upon overlap with one of the indicator elements and a second level upon overlap with one of the intermediate spaces between the indicator elements;

detecting, from the sensor signal, rising edges corresponding to leading flanks of the indicator elements; and determining a rotational angle position based on a sequence of three different indicator element extensions in the circumferential direction, wherein flanks of the indicator elements of the camshaft encoder wheel that are arranged in the same direction, either the leading flanks or the trailing flanks, are arranged equidistant from one another in the circumferential direction, wherein the indicator elements of the camshaft encoder wheel each have one of three different indicator element extensions in the circumferential direction, and at least two directly adjacent indicator elements form an indicator element pair and have the same indicator element extensions.

* * * * *